US010341288B2

United States Patent
Frydman et al.

(10) Patent No.: US 10,341,288 B2
(45) Date of Patent: Jul. 2, 2019

(54) METHODS CIRCUITS DEVICES SYSTEMS AND ASSOCIATED COMPUTER EXECUTABLE CODE FOR PROVIDING CONDITIONAL DOMAIN NAME RESOLUTION

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: SAGUNA NETWORKS LTD., Yokneam Illit (IL)

( * ) Notice: Subject to any disclaimer, the term of this patent is extended or adjusted under 35 U.S.C. 154(b) by 413 days.

(21) Appl. No.: 14/924,770

(22) Filed: Oct. 28, 2015

(65) Prior Publication Data

US 2016/0050178 A1    Feb. 18, 2016

Related U.S. Application Data

(63) Continuation-in-part of application No. 13/739,067, filed on Jan. 11, 2013.

(60) Provisional application No. 61/585,251, filed on Jan. 11, 2012.

(51) Int. Cl.
*H04L 29/12* (2006.01)

(52) U.S. Cl.
CPC ...... *H04L 61/1552* (2013.01); *H04L 61/1511* (2013.01); *H04L 61/609* (2013.01); *H04L 61/6009* (2013.01)

(58) Field of Classification Search
CPC ............ H04L 61/1552; H04L 61/1511; H04L 61/609; H04L 61/6009
See application file for complete search history.

(56) References Cited

U.S. PATENT DOCUMENTS

2010/0274970 A1* 10/2010 Treuhaft ........... H04L 29/12066
                                                            711/118
2015/0215267 A1*  7/2015 Kagan ................. H04L 61/1511
                                                            709/245

* cited by examiner

*Primary Examiner* — Kim T Nguyen
(74) *Attorney, Agent, or Firm* — Vladimir Sherman; Professional Patent Solutions

(57) ABSTRACT

Disclosed are methods, circuits, devices, systems and associated computer executable code for providing Domain Name Resolution functionality to a data client device accessing a networked data resource through an access point of a data communication network. According to some embodiments, an access point or node of a data communication network may be integral or otherwise functionally associated with a conditional domain name system (CDNS), which CDNS may include a local cache of conditional DNS records.

21 Claims, 8 Drawing Sheets

METHODS CIRCUITS DEVICES SYSTEMS AND ASSOCIATED COMPUTER EXECUTABLE CODE FOR PROVIDING CONDITIONAL DOMAIN NAME RESOLUTION

CROSS REFERENCE

The present application is a continuation-in-part of U.S. Utility patent application Ser. No. 13/739,067, filed Jan. 11, 2013. U.S. Utility patent application Ser. No. 13/739,067 claims the benefit of U.S. Provisional Application No. 61/585,251 filed Jan. 11, 2012. The disclosures of the aforementioned applications are incorporated herein by reference in their entirety.

FIELD OF THE INVENTION

Some embodiments relate generally to the field of domain name systems and, more particularly, to methods, circuits, devices, systems and associated computer executable code for providing conditional domain name resolution.

BACKGROUND

Remote on-demand access to computer and communication network resources, including Internet access is widespread. With the Internet becoming increasingly popular, more network users are able to connect to a remote server through any device with an internet connection. Users are able to connect to the Internet from home computers, laptops, tablets, smart phones, e-book readers, and any other mobile Internet device. When connected to the internet, users often download or stream significant amounts of data from various data sources, such as websites, hosted on servers connected to the internet.

Data servers connected to a data network, such as the Internet, at one or more network nodes are typically identifiable and addressable using an Internet Protocol (e.g. IP v4 and v6) address. Websites and other data sources connected to the Internet are, however, typically associated with a server name or domain name. The Domain Name System (DNS) is a hierarchical distributed naming system for computers, services, or any resource connected to the Internet or a private network. It associates various information with domain names assigned to each of the participating entities. A Domain Name Service resolves queries for these names into IP addresses for the purpose of locating computer services and devices either on a local network or worldwide on the Internet. By providing a worldwide, distributed keyword-based redirection service, the Domain Name System is an essential component of the functionality of the Internet.

An often-used analogy to explain the Domain Name System is that it serves as the phone book for the Internet by translating human-friendly computer hostnames into IP addresses. For example, the domain name www.example.com translates to the addresses 192.0.43.10 (IPv4) and 2620:0:2d0:200::10 (IPv6). Unlike a phone book, DNS can be quickly updated and these updates are distributed, allowing a service's location on the network to change without affecting the end users, who continue to use the same hostname. Users take advantage of this when they recite meaningful Uniform Resource Locators (URLs) and e-mail addresses without having to know how the computer actually locates the services.

The Domain Name System distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism has made the DNS distributed and fault tolerant and has helped avoid the need for a single central register to be continually consulted and updated. Additionally, the responsibility for maintaining and updating the master record for the domains is spread among many domain name registrars, who compete for the end-user's, domain-owner's, business. Domains can be moved from registrar to registrar at any time.

The Domain Name System also specifies the technical functionality of this database service. It defines the DNS protocol, a detailed specification of the data structures and communication exchanges used in DNS, as part of the Internet Protocol Suite.

The Internet maintains two principal namespaces, the domain name hierarchy and the Internet Protocol (IP) address spaces. The Domain Name System maintains the domain name hierarchy and provides translation services between it and the address spaces. Internet name servers and a communication protocol implement the Domain Name System. A DNS name server is a server that stores the DNS records for a domain name, such as address (A) records, name server (NS) records, and mail exchanger (MX) records (see also list of DNS record types); a DNS name server responds with answers to queries against its database.

The growing demand for packet data (e.g. TCP/IP) services over mobile networks, including: (1) mixed and rich content websites, (2) video and audio content streaming, has fostered enormous bandwidth and data traffic requirements for mobile communication/access networks. A single webpage may include URL's to multiple content sources, static and dynamic, and the loading of a single webpage may typically require between 15 and 20 DNS transactions with a remote DNS server. During peak network traffic hours, these requests may take between 3 and 4 seconds, thereby leading to a long delay in start of service and to customer frustration.

There is thus a need in the field of caching systems for improved methods, circuits, devices, systems and associated computer executable code for providing handling DNS transactions.

SUMMARY OF THE INVENTION

The present invention may include a zone specific domain name system (ZSDNS) associated with an access point of a data access network. The ZSDNS may include a DNS query detector to detect DNS queries to a remote DNS server submitted by a data client device through said access point, control logic circuitry to search a local DNS cache for records relevant or responsive to the submitted query while allowing the submitted query to pass to the remote DNS server, and a DNS query responder to respond to the DNS query of the data client device in the event records relevant or responsive to the submitted query are identified in said local cache. According to some embodiments, there ZSDNS may include a local DNS database cache updater to update the local cache with information from a response received from the remote DNS cache. Updating may include amending a record of the local DNS cache and/or updating may include appending new records to the local DNS cache.

Some embodiments of the present invention include a data access network comprising a set of access points to provide network access to data client devices and a zone specific domain name system (DNS) associated with one or more of the access points and comprising.

The present invention includes methods, circuits, devices, systems and associated computer executable code for providing domain name resolution for network data applications (e.g. web browsers) running on data client devices (e.g. smartphones) connecting to a network through an access point. The access point may be a wireless access point such as a WiFi access point or a cellular network base-station or a cellular network cell-site. According to further embodiments, a DNS server, database and/or cache, integral or otherwise functionally associated with one or more access points, may provide domain name resolution services to a data client requesting DNS service through any of the one or more access points. The access point associated DNS server, database and/or case may be referred to as a Zone Specific Domain Name System (ZSDNS).

According to embodiments, a ZSDNS may provide location specific responses to DNS queries submitted by a data client device based on a location or region of the data client device accessing the localized DNS. A location or region of the data client may be estimated to be somewhere in the coverage area of the access point. Alternatively, the location may be more accurately estimated using localization (e.g. Direction of Arrival Detection, Signal Strength Detection, Triangulation, etc.) circuitry of the access point. According to yet further embodiments, ZSDNS may provide location specific responses to DNS queries based on a geographic location or region of the access point associated with the local ZSDNS, such that any data client device submitting a DNS query through a specific access point is assumed to be in a generally vicinity defined by a coverage area of the specific access point. The geographic location of the date client device may be assumed to be generally the same as the geographic location of the access point through which the data client device summited the DNS query.

According to some embodiments, the ZSDNS may include: (1) a DNS query detector, (2) a local DNS database cache, (3) control logic circuitry (4) a DNS query responder, (5) a remote DNS response interceptor, and (6) a local DNS database cache updater. The DNS query detector may detect a DNS query submitted to a remote DNS server by data client device connected to an access point with which the DNS query detector is functionally associated. ZSDNS control logic circuitry may use the detected query to search the local DNS database cache for one or more DNS records which may provide a resolution to the detected DNS query. The submitted query may concurrently either be forwarded or allowed to pass to the remote DNS server to which the query was addressed by the data client device. In the event one or more records responsive to the DNS query are identified in the local cache: (a) the DNS query responder may generate and transmit to the data client device a DNS query response indicative of DNS resolution information contained within the identified record(s); (b) any DNS query response received from the remote DNS server may be intercepted and blocked by a remote DNS response interceptor such that it is not received by the query submitting data client device; and (c) the DNS query response received from the remote DNS may be used by the local DNS database cache updater to update the one or more corresponding records in the local DNS cache. In the event one or more records responsive to the DNS query are not identified in the local cache: (a) any DNS query response received from the remote DNS server may be forwarded or allowed to pass by the interceptor to the data client device; and (b) the DNS query response received from the remote DNS may be used by the local DNS database cache updater for generating new DNS records in the local DNS cache reflective of the DNS resolution information contained within the response received from the remote DNS server.

All of the ZSDNS activities may be coordinated and/or regulated by control logic circuitry, which circuitry may either be dedicated circuitry, for example a controller chip, or may be code executed on a general purpose processor. Any of the above mentioned functional blocks and their respective functions may be integrated with any one or more of the functional block.

According to some embodiments where the access points are cellular base stations or cell-sites, the ZSDNS may include a packet data (e.g. TCP/IP) tunnel detector and optionally a mobile tunnel interceptor/generator (e.g. GTP-U) for providing the above mentioned DNS query manipulations on data client devices accessing internet resources through the cellular network.

According to further embodiments, DNS records contained within the local DNS cache may be location specific and optionally date, time or environmental condition specific. More specifically, an IP address provided by the local DNS cache in response to a given domain or URL may vary depending upon factors such as location of the data client device, time of day at the data client device's location, date at the data client device's location, day of the week at the data client device's location, and environmental conditions (e.g. temperature, weather conditions, etc.) at the data client device's location. Additionally, an IP address provided by the local DNS cache in response to a given domain or URL may vary depending upon a network operator's commercial preferences. For example, advertising selection/insertion/injection (e.g. banners, links, etc.) may be performed by the operator through local DNS record manipulations, and the advertising content selected by the operator may be that advertising deemed commercially valuable to the operator. According to some embodiments, the local DNS database cache updater may include an Application Interface (API) for enabling the network operator, owner or other authorized party to update the local DNS database with predefined DNS responses for specific requests, as described above.

According to some embodiments, the present invention provides for DNS query resolution from one or more points in proximity to a customer using a smartphone as a data client device, namely in or near the cell-site being used. Moving DNS resolution capability closer to the data client device may lead to a shortening of the start of data services (e.g. website downloading) to only several 10's of milliseconds. Said approach may also enable a unique implementation of location based advertisement and other location based services without the need to extract any location information from the data client device itself.

According to further embodiment, either associated with a zone specific DNS or not, there may be provided a conditional DNS server (CDNS). The conditional DNS may be zone specific or not and may include or be otherwise functionally associated with a database or data table of DNS records, wherein a DNS record may include field values correlating a networked data resource designator, such as a URL of a website or application server, with a network address of the designated networked data resource, for example an IPv4 internet address of a website or application server designated by the URL. At least some of the DNS records may be conditional DNS records, which conditional DNS records may be processed and/or interpreted in accordance with one or more conditions associated with the conditional DNS record, for example as a function of whether a defined condition associated with the record is met or not. A conditional DNS according to embodiments may also include a Condition Checking Unit (CCU) adapted to check whether a condition associated with a specific DNS record is met. According to such embodiments, which response may be provided by the CDNS for a given a DNS request or query relating to a requested networked data resource may depend on an output of the CCU.

One or a set of condition definitions, also referred to a defined conditions or simply as conditions, associated with a conditional DNS record according to embodiments may be stored as a string or as a value within one or more fields of the DNS record and/or within one or more fields of an associated/linked record. Condition definitions associated with a DNS record or a set of DNS records for a given networked data resource may include factors or parameters such as: (a) a physical location of a requesting device, (b) a physical location of requested resource, (c) availability of the requested resource, (d) an identity of the requestor, (e) user credential or authentication requirements of the requested resource, (f) a characteristic of the requested resource, (g) a characteristic of a cached copy of the requested resources, (h) an indicator of a previous update or synchronization between the requested resource and the cache copy of the requested resource, (i) a time of day at the client, (j) a day or date at the client, (k) a time of day at the requested resource, (l) a day or date at the requested resource.

A given condition definition of a conditional DNS record for a given networked data resource may instruct or otherwise cause the CDNS to provide a DNS response of a first type, optionally in the form of a first network or Internet address, responsive to a DNS request/query for the given networked data resource when the given condition is met. The given condition definition of the conditional DNS record may instruct or otherwise cause the CDNS to provide a DNS response of a second type to a DNS request for the networked data resource, optionally in the form of a second network or Internet address, when the respective condition is not met. Different optional DNS responses to a DNS request for a network resource associated with a conditional DNS record may include: (a) a default network address of the requested networked data resources, (b) a network address of a cached copy of the requested resource, or (c) a network address of a proxy network device adapted to manage a request for the requested networked data resource.

A conditional DNS record may include multiple defined conditions, wherein each condition may be associated with one or more respective responses—for example one response when a condition is met and another response when the same condition is not met. The conditional DNS record may also include a default response definition for when defined conditions are not met. According to further embodiments, the CDNS may store multiple conditional records for each networked data resource and each record may include a single condition definition, wherein each condition definition may be for a simple or composite condition and may be associated with a specific DNS responses.

A conditional DNS (CDNS) according to embodiments of the present invention, optionally in the form of a server integral or functionally associated with an access segment of data communication network, may respond to a DNS request matched to a conditional DNS record pursuant to instructions, parameters and/or values included or otherwise associated with the conditional DNS record. A Conditional DNS Request Response Unit (CDNSRU) integral or otherwise associated with the CDNS may generate and transmit to the device issuing the DNS query or request a response at least partially based on an output of a Condition Checking Unit (CCU) integral or otherwise functionally associated with the CDNS. A DNS request response generated by a conditional DNS server according to embodiments may include: (a) a network address of the originally requested networked data resources, (b) a network address of a cached copy of the requested resources, or (c) a network address of a proxy device adapted to manage a requests to a networked data resource associated with the DNS request.

With which response the conditional DNS server responds to a given DNS request may depend on results of the CCU's condition checking activities at or before the time of arrival of the given DNS request at the DNS server. According to further embodiments, the CCU may check a status related to one or more defined conditions associated with one or more conditional DNS records when a DNS request for the network resource associated with the one or more record arrives at the CDNS. According to some embodiments, the CCU may intermittently check a status related to defined conditions associated with conditional DNS records stored on the DNS server, irrespective of a DNS query arriving or not.

A conditional DNS or DNS server according to some embodiments may be adapted to respond to a DNS query/request from a client device for a network address of a given networked data resource by checking whether the networked data resource (e.g. website or application server) requires user authentication, session persistence, or some other communication characteristic which might preclude the use of a cached version of the networked data resource. According to such embodiments, the CCU or a functionally associated module of the conditional DNS server may generate and send a request packet to the given networked data resource to check for such a characteristic. By programmatically analyzing one or more data packets sent by the given networked data resource responsive to the CCU's request packet, the CCU may determine whether the given network resource requires user, device or session authentication to provide one or more data services. In the event that the given network resources is found to require authentication, the conditional DNS may respond to the DNS query/request from the data client device with a network address of the given networked data resource, thereby facilitating a direct connection between the data client device and the networked data resource whose network address was requested by the data client device. In the event authentication or another similar communication characteristic is not required by the networked data resource, the conditional DNS may respond to the DNS request, for example through its CDNSRU, with the network address of an alternate network resource. The alternate network resource may or may not have substantially identical content to that provided by the requested networked data resource. Examples of possible alternate network resources are: (1) a content delivery network, (2) a local content cache integral or otherwise functionally associated with the data communication network of the CDNS, (3) a local content server connected to or otherwise functionally associated with the data communication network of the CDNS.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
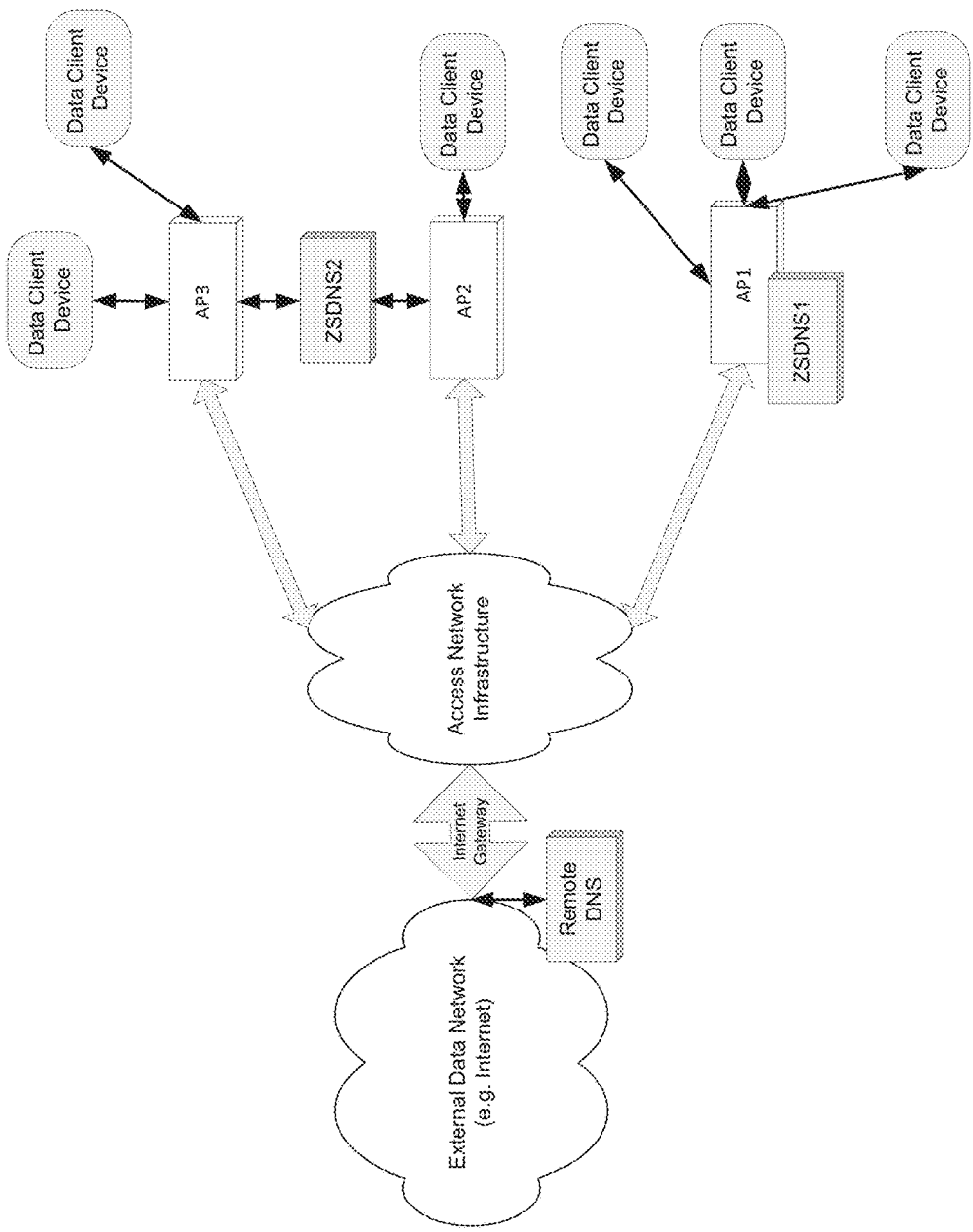
FIG. 1A is a conceptual network diagram of an exemplary access network including zone specific domain name systems according to embodiments.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can comprise, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

The present invention includes methods, circuits, devices, systems and associated computer executable code for providing domain name resolution for network data applications (e.g. web browsers and applications requiring access to application servers) running on data client devices (e.g. smartphones) connecting to a network through an access point. The access point may be a wireless access point such as a WiFi access point or a cellular network base-station or a cellular network cell-site. According to further embodiments, a DNS server, database and/or cache, integral or otherwise functionally associated with one or more access points, may provide domain name resolution services to a data client requesting DNS service through any of the one or more access points. The access point associated DNS server, database and/or case may be referred to as a Zone Specific Domain Name System (ZSDNS).

According to embodiments, a ZSDNS may provide location specific responses to DNS queries submitted by a data client device based on a location or region of the data client device accessing the localized DNS. A location or region of the data client may be estimated to be somewhere in the coverage area of the access point. Alternatively, the location may be more accurately estimated using localization (e.g. Direction of Arrival Detection, Signal Strength Detection, Triangulation, etc.) circuitry of the access point. According to yet further embodiments, ZSDNS may provide location specific responses to DNS queries based on a geographic location or region of the access point associated with the local ZSDNS, such that any data client device submitting a DNS query through a specific access point is assumed to be in a generally vicinity defined by a coverage area of the specific access point. The geographic location of the date client device may be assumed to be generally the same as the geographic location of the access point through which the data client device summited the DNS query.

According to some embodiments, the ZSDNS may include: (1) a DNS query detector, (2) a local DNS database cache, (3) control logic circuitry (4) a DNS query responder, (5) a remote DNS response interceptor, and (6) a local DNS database cache updater. The DNS query detector may detect a DNS query submitted to a remote DNS server by data client device connected to an access point with which the DNS query detector is functionally associated. ZSDNS control logic circuitry may use the detected query to search the local DNS database cache for one or more DNS records which may provide a resolution to the detected DNS query. The submitted query may concurrently either be forwarded or allowed to pass to the remote DNS server to which the query was addressed by the data client device. In the event one or more records responsive to the DNS query are identified in the local cache: (a) the DNS query responder may generate and transmit to the data client device a DNS query response indicative of DNS resolution information contained within the identified record(s); (b) any DNS query response received from the remote DNS server may be intercepted and blocked by a remote DNS response interceptor such that it is not received by the query submitting data client device; and (c) the DNS query response received from the remote DNS may be used by the local DNS database cache updater to update the one or more corresponding records in the local DNS cache. In the event one or more records responsive to the DNS query are not identified in the local cache: (a) any DNS query response received from the remote DNS server may be forwarded or allowed to pass by the interceptor to the data client device; and (b) the DNS query response received from the remote DNS may be used by the local DNS database cache updater for generating new DNS records in the local DNS cache reflective of the DNS resolution information contained within the response received from the remote DNS server.

All of the ZSDNS activities may be coordinated and/or regulated by control logic circuitry, which circuitry may either be dedicated circuitry, for example a controller chip, or may be code executed on a general purpose processor. Any of the above mentioned functional blocks and their respective functions may be integrated with any one or more of the functional block.

According to some embodiments where the access points are cellular base stations or cell-sites, the ZSDNS may include a packet data (e.g. TCP/IP) tunnel detector and optionally a mobile tunnel interceptor/generator (e.g. GTP-U) for providing the above mentioned DNS query manipulations on data client devices accessing internet resources through the cellular network.

According to further embodiments, DNS records contained within the local DNS cache may be location specific and optionally date, time or environmental condition specific. More specifically, an IP address provided by the local DNS cache in response to a given domain or URL may vary depending upon factors such as location of the data client device, time of day at the data client device's location, date at the data client device's location, day of the week at the data client device's location, and environmental conditions (e.g. temperature, weather conditions, etc.) at the data client device's location. Additionally, an IP address provided by the local DNS cache in response to a given domain or URL may vary depending upon a network operator's commercial preferences. For example, advertising selection/insertion/injection (e.g. banners, links, etc.) may be performed by the operator through local DNS record manipulations, and the advertising content selected by the operator may be that advertising deemed commercially valuable to the operator. According to some embodiments, the local DNS database cache updater may include an Application Interface (API) for enabling the network operator, owner or other authorized party to update the local DNS database with predefined DNS responses for specific requests, as described above.

According to some embodiments, the present invention provides for DNS query resolution from one or more points in proximity to a customer using a smartphone as a data client device, namely in or near the cell-site being used. Moving DNS resolution capability closer to the data client device may lead to a shortening of the start of data services (e.g. website downloading) to only several 10's of milliseconds. Said approach may also enable a unique implementation of location based advertisement and other location based services without the need to extract any location information from the data client device itself.

Figure 1B:
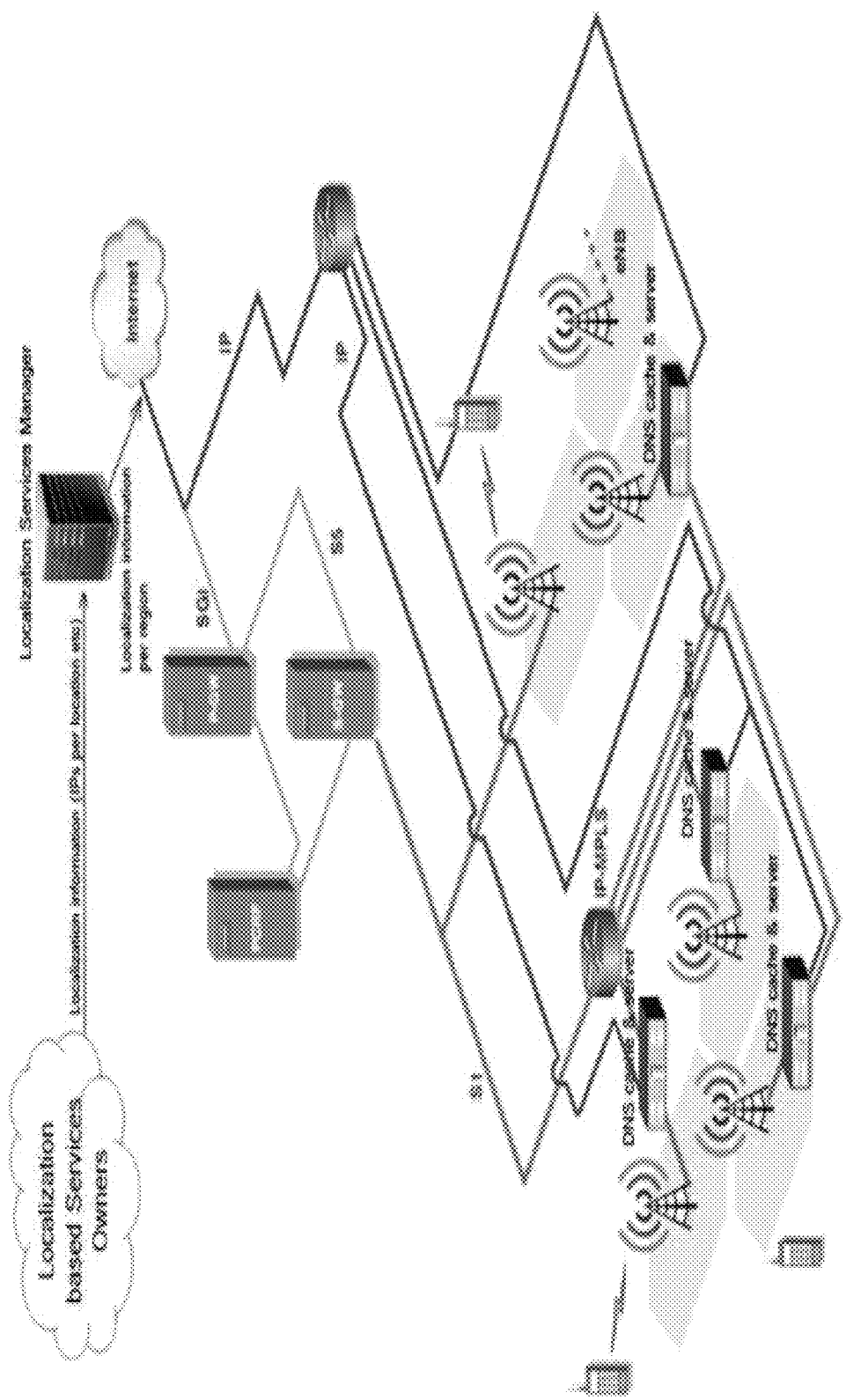
FIG. 1B shows a network level diagram of a mobile (cellular) communications network including multiple access points (base stations) through which data clients may access internet resources and further include zone specific domain name systems functionally linked to the access points.

Turning now to FIG. 1A, there is shown a conceptual network diagram of an exemplary access network including zone specific domain name systems according to embodiments. A first ZSDNS, labeled ZSDNS1, is shown substantially integrated with a first access point (AP1) and a second ZSDNS, labeled ZSDNS2, is shown functionally associated with two AP's, AP2 and AP3. The ZSDNS's function as described above and provide first level DNS resolution services to data client devices connect to their respective AP's. In the event a DNS query cannot be resolved a given ZSDNS, a response from a remote DNS may be forwarded to the query submitting data client device. FIG. 1B shows a network level diagram of a mobile (cellular) communications network embodiment of the present invention including multiple access points (base stations) through which data clients may access internet resources and further. Some of the network base-stations include zone specific domain name systems, therein denoted as "DNS cache & server". FIG. 1B also shows a localization services manager providing network access to localization based services owners/providers.

Figure 2A:
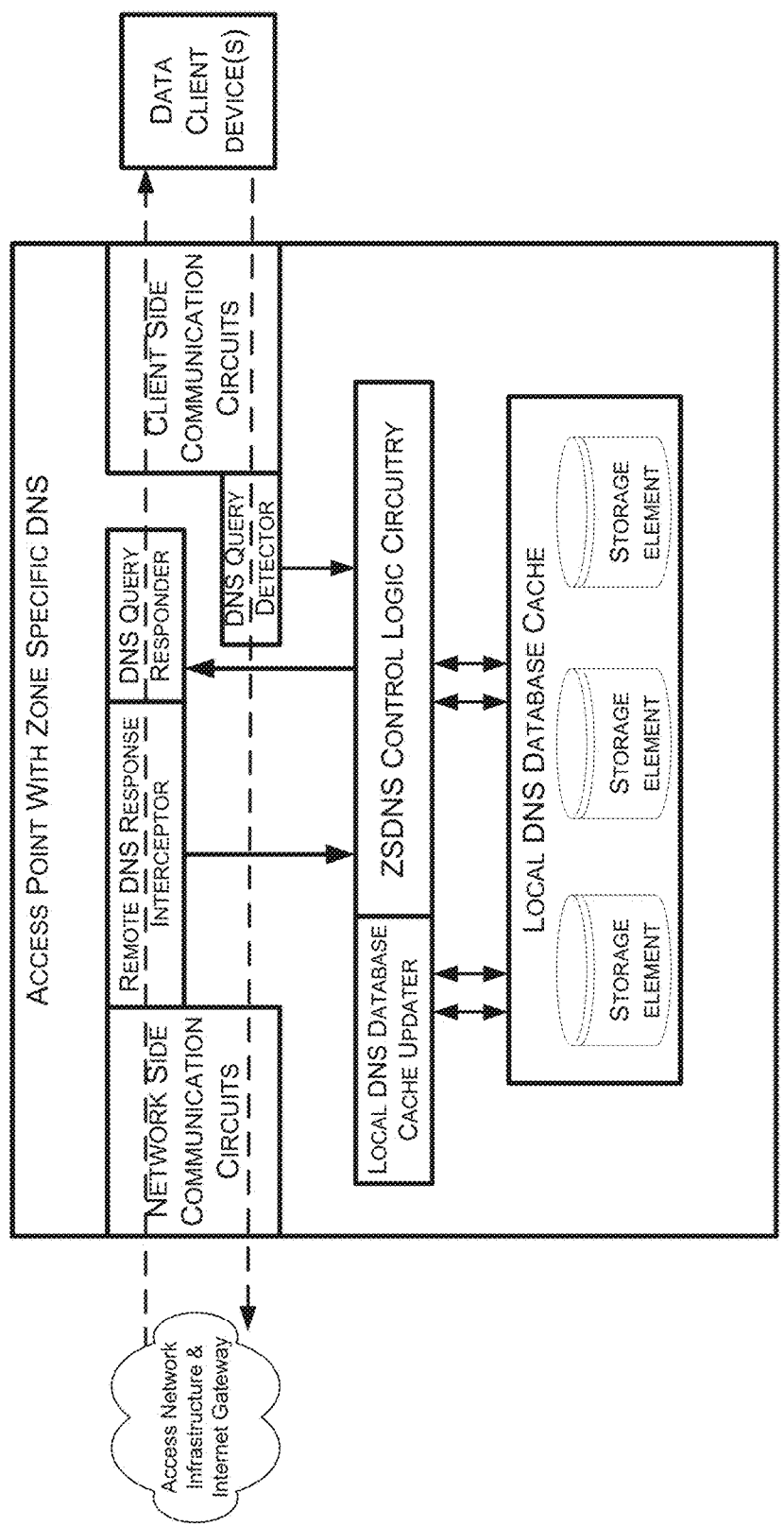
FIG. 2A shows a general system level diagram of an exemplary zone specific domain name system integrated with access points of a data network according to embodiments.
Figure 2B:
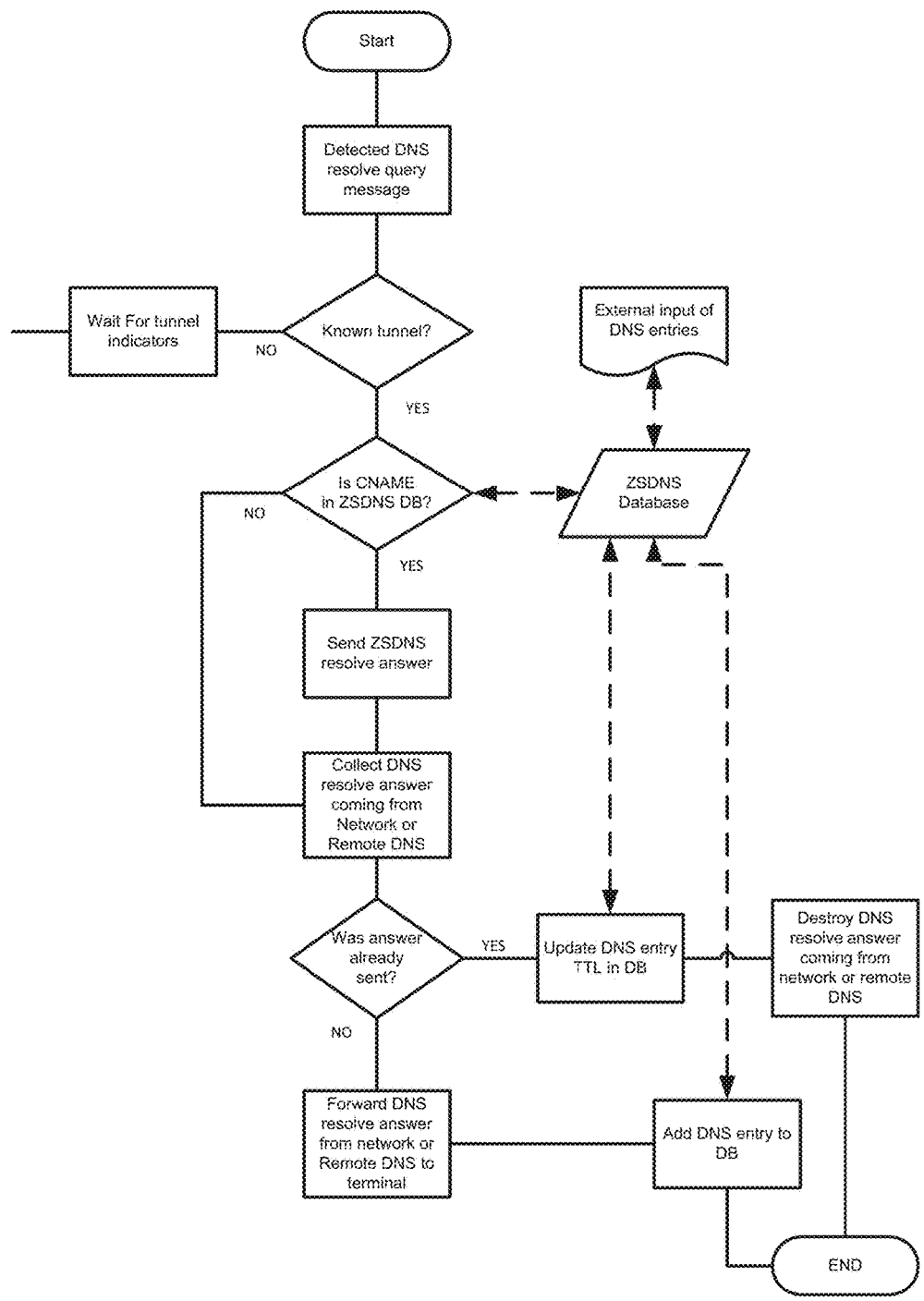
FIG. 2B is a flowchart including steps of an exemplary method for providing zone specific domain name resolution as may be provided by a ZSDNS according to embodiments.
Figure 2C:
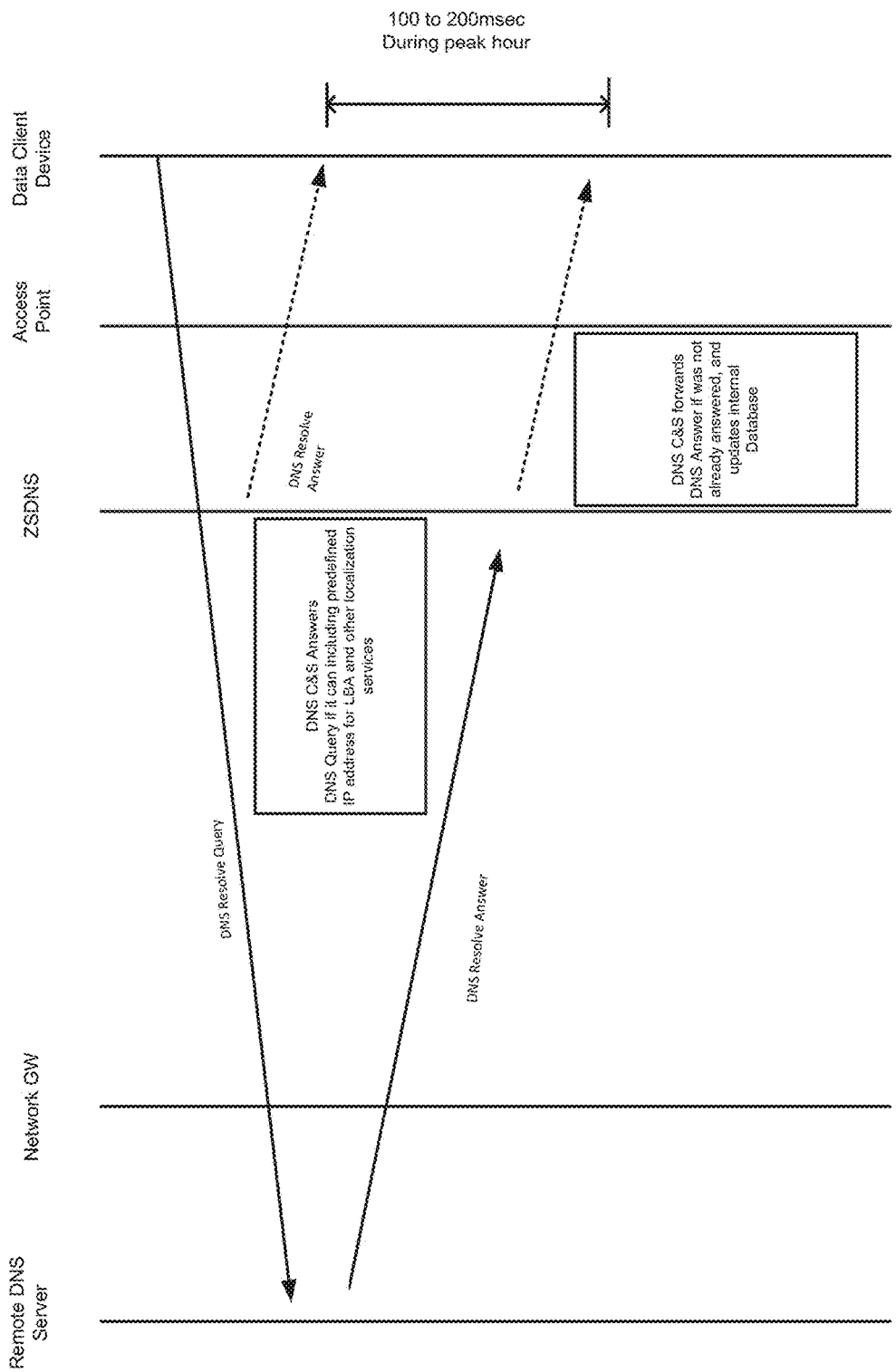
FIG. 2C is signal/information flow diagram corresponding to FIGS. 2A and 2B.

Turning now to figure FIG. 2A, there is show a general system level diagram of an exemplary zone specific domain name system integrated into a network access point according to embodiments. A description of the operation of the ZSDNS of FIG. 2A may be made in conjunction with the flowchart of FIG. 2B, including steps of an exemplary method for providing zone specific domain name resolution as may be provided by a ZSDNS according to embodiments, and further in conjunction with the signal/information flow diagram or FIG. 2C. The access point with ZSDNS of FIG. 2A includes: (1) a DNS query detector, (2) a local DNS database cache, (3) control logic circuitry (4) a DNS query responder, (5) a remote DNS response interceptor, and (6) a local DNS database cache updater. The DNS query detector may detect a DNS query submitted to a remote DNS server by data client device connected to an access point with which the DNS query detector is functionally associated. ZSDNS control logic circuitry may use the detected query to search the local DNS database cache for one or more DNS records which may provide a resolution to the detected DNS query. The submitted query may concurrently either be forwarded or allowed to pass to the remote DNS server to which the query was addressed by the data client device. In the event one or more records responsive to the DNS query are identified in the local cache: (a) the DNS query responder may generate and transmit to the data client device a DNS query response indicative of DNS resolution information contained within the identified record(s); (b) any DNS query response received from the remote DNS server may be intercepted and blocked by a remote DNS response interceptor such that it is not received by the query submitting data client device; and (c) the DNS query response received from the remote DNS may be used by the local DNS database cache updater to update the one or more corresponding records in the local DNS cache. In the event one or more records responsive to the DNS query are not identified in the local cache: (a) any DNS query response received from the remote DNS server may be forwarded or allowed to pass by the interceptor to the data client device; and (b) the DNS query response received from the remote DNS may be used by the local DNS database cache updater for generating new DNS records in the local DNS cache reflective of the DNS resolution information contained within the response received from the remote DNS server.

Figure 3A:
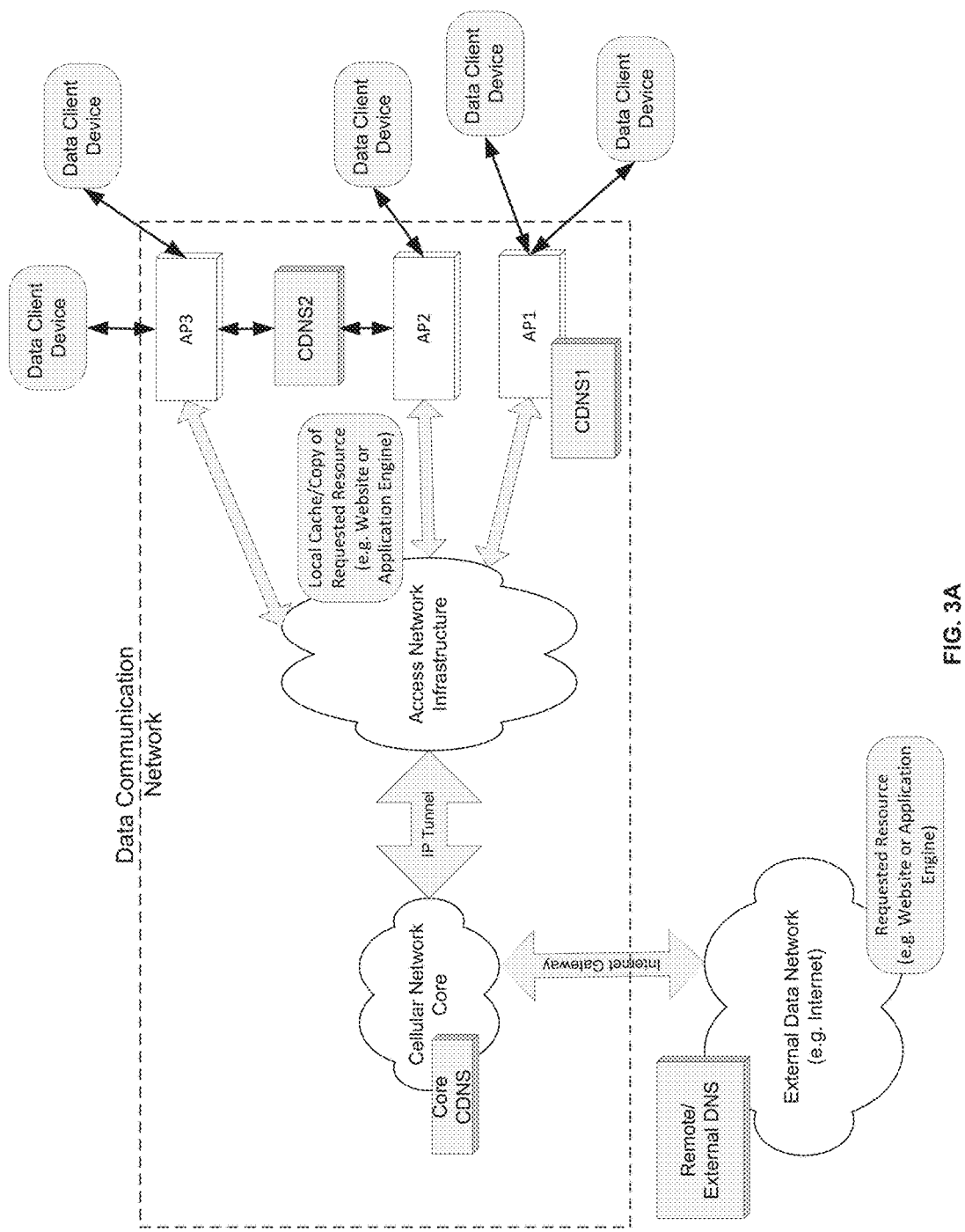
FIG. 3A shows an exemplary data communication network according to embodiments including conditional domain name systems (CDNS) integrated or otherwise functionally associated with access points of the data network.

Turning now to FIG. 3A, there is shown an exemplary data communication network according to embodiments of the present invention including conditional domain name systems (CDNS) integrated or otherwise functionally associated with access points of the data communication network. The exemplary network shown in FIG. 3A includes a network core portion, such as may be found in cellular networks or other data communication networks. The data communication network of FIG. 3A also includes a network access segment or portion with infrastructure comprising multiple access points, wherein the access points may be cellular base-stations, Wi-Fi access points or some combination of either. The access points may be wireless, such as in the case of cellular base-stations or Wi-Fi. The access points may also include wired access ports.

FIG. 3A shows three separate CDNS's coupled to the network at different points: (1) CDNS1 is integral with Access Point 1 (AP1) and provides DNS service responsive to requests or queries from mobile client devices communicatively coupled to the network through AP1; (2) CDNS2 is functionally associated with each of two Access Points (AP2 & AP3) and provides DNS service responsive to requests or queries from mobile client devices communicatively coupled to the network through AP2 and AP3; and (3) Core CDNS is functionally associated with the core segment of the data communication network and may provide DNS service responsive to requests or queries from data client devices communicatively coupled to the network through access points other than AP1, AP2 and AP3. At least one CDNS of FIG. 3A may include some or all of the functional components, electrical circuits and code, of the CDNS shown in FIG. 3B. At least one CDNS of FIG. 3A may operate in accordance with the method of providing conditional DNS service illustrated by the flowchart of FIG. 3C.

Also shown in FIG. 3A are data client devices communicatively coupled to AP's of the data communication network. Applications running on these data client devices may issue DNS queries/requests addressed to an external or remote DNS server connected to the internet outside of the data communication network, optionally through an external data network. The DNS queries/requests may designate a specific networked data resources or services, also residing outside of the data communication network, for which an Internet network address is required by the query issuing application/device in order to access the designated networked data resource or service. As illustrated by FIG. 3A, the networked resource or service for which an Internet network address is requested may be located outside the data communication network (i.e. connected to an external communication network) while a local cached copy of the networked data resources may be connected to the data communication network, for example, at or near the access network portion/infrastructure of the data communication network. A given CDNS, integral or otherwise functionally associated with a given AP through which a given data client's DNS query or request is received at the data communication network, may detected and process the request/query of the given data client. According to some embodiments, DNS request processing may include blocking the request from being forward to an external DNS server, while according to other embodiments, DNS processing includes forwarding the DNS request to an external DNS server.

Figure 3B:
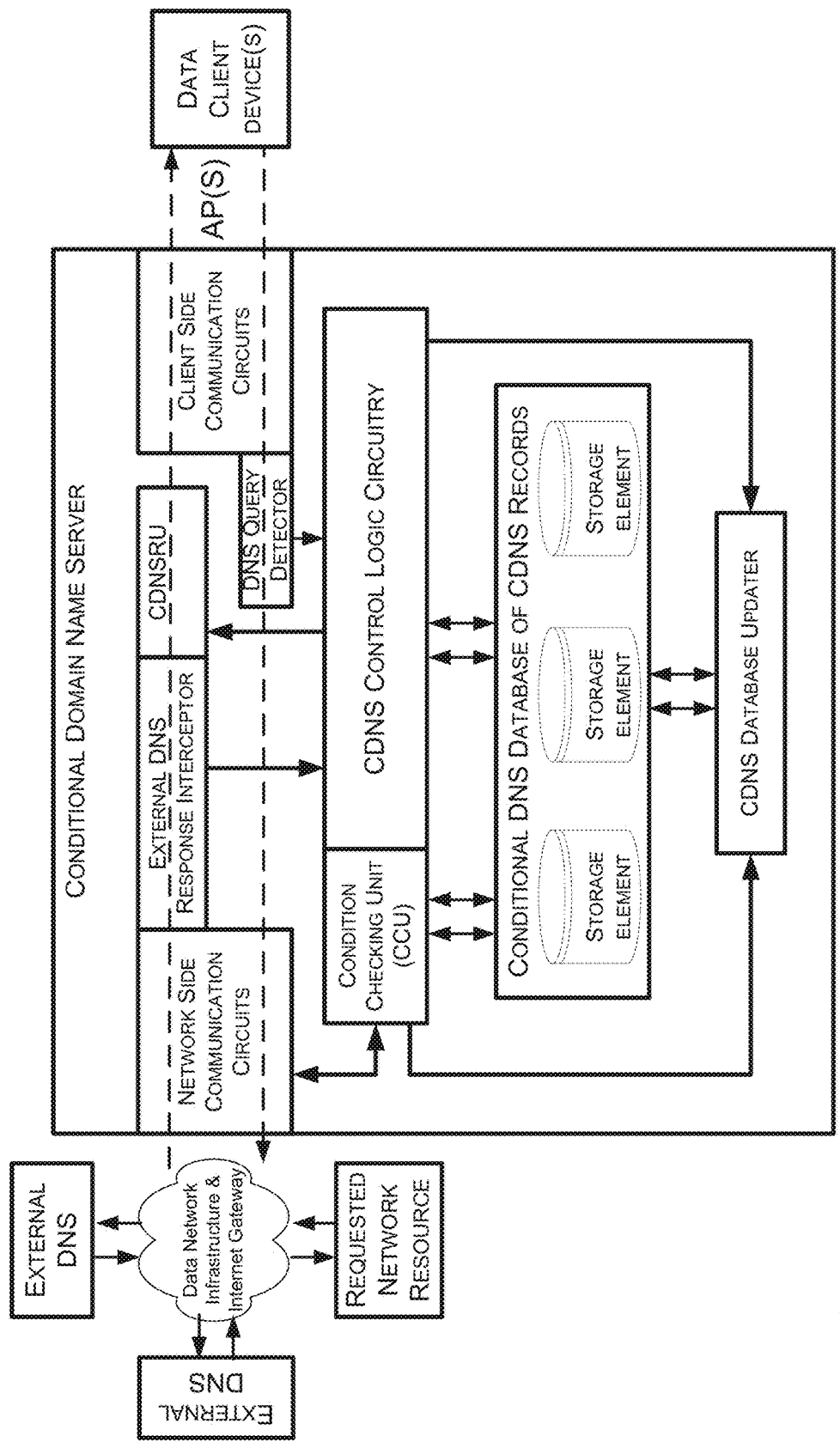
FIG. 3B is a functional block diagram of a CDNS according to embodiments of the present invention.
Figure 3C:
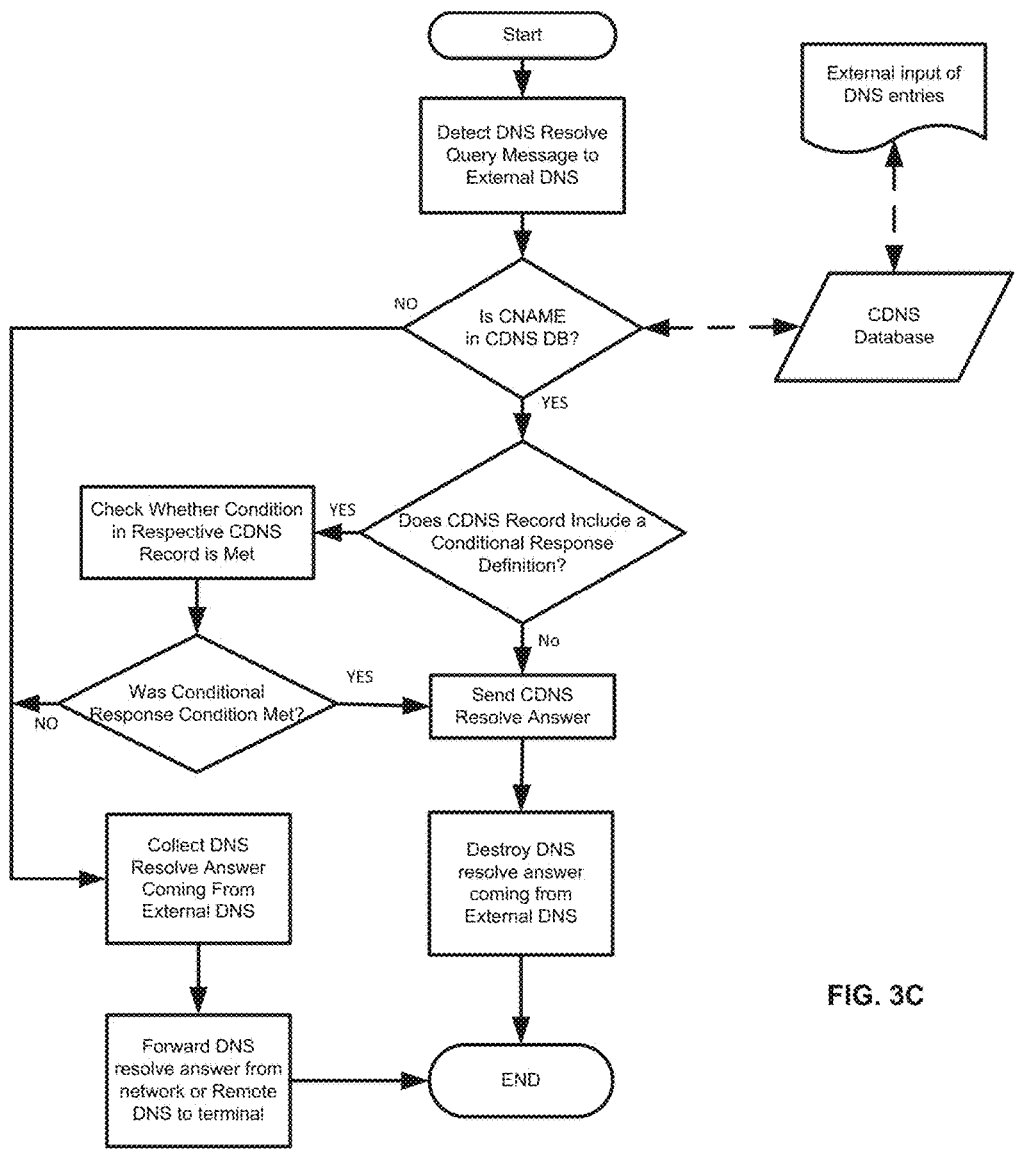
FIG. 3C is a flowchart including steps of an exemplary method for conditional domain name resolution as may be provided by a CDNS according to embodiments.

Turning now to FIG. 3B, there is shown a functional block diagram of a CDNS according to embodiments of the present invention. Operation of the CDNS of FIG. 3B may be described in conjunction with the steps of the flowchart of FIG. 3C, wherein FIG. 3C shows a flowchart including steps of an exemplary method for conditional domain name resolution as may be provided by a CDNS according to embodiments of the present invention. A DNS query detector of the CDNS may detect an outbound DNS query issued by a data client and addressed to an External DNS, and the detector may forward a copy of the DNS query for processing to the CDNS control logic. The control logic may check weather one or more records corresponding to the network resource designated in the outbound DNS query is present in the CDNS data storage, and if so, a condition checking unit (CCU) may evaluate any conditions which may be defined within the identified records. A CDNS response Unit (CDNSRU) may generate and send a DNS query response to the DNS query issuing data client based on the identified DNS record and based in an output of the CCU. An External DNS Response Interceptor of the CDNS may block any DNS responses issued by the External DNS responsive to the DNS query, and for which the CDNSRU generated a response, from reaching the DNS query issuing data client device. Under certain conditions of a conditional DNS record, such as previously described in this application (e.g. the designated network data resource does not require authentication), the CDNSRU response to a data client may include an IP address of a local and/or cached copy of the network resource designated by the data client's DNS query. Under different conditions, or in the event of a failure to confirm a defined condition, the CDNSRU response may include the actual internet IP address of the designated resource. Alternatively, in the event of a failure, for example by the CCU, to confirm a defined condition, the CDNSRU may simply not generate a response to the DNS query and the interceptor may allow a DNS response generated at the External DNS to pass through the data communication network and reach the DNS query issuing client data device. When a CNDS record corresponding to the detected DNS request/query is not found in the CDNS data storage, the CDNS may not interfere with the normal flow of the DNS request and response, between the issuing data client and the external DNS, and may then update its local storage with the DNS response from the External DNS.

Either the CDNS and/or the ZSDNS, or some hybrid of both, may support an internal mechanism (table or other) to convert URLs to predefined IP addresses. There may be provided an API via which a remote management system may configure this internal mechanism. This configuration may be done using standard management protocols such as SNMP, Web interface, or any other standard files (Excel or other) which contain all the required localization information, or by any other configuration means. This capability enables the owners of the advertisements and web content to predefine what information will be distributed to users at each region.

According to further embodiment, the CDNS and/or the ZSDNS, or some hybrid of both, may run in tunneled areas of the network supporting any type on tunnel such as L2TP, GTP, PPP, IuPS, IuB etc. The system may listen on all traffic coming from a terminal through a network end point (cell site or other) on UDP port 53 or any other port assigned for DNS services in the network to detect DNS requests. Per each DNS request the system will try to generate a response locally using cached DNS responses for the identical DNS requests, and the tunnel header which corresponds to the terminals tunnel. Into these responses the system may (if preconfigured) insert the localization information thus passing to the terminal IP addresses of content that are relevant for that region. In any case, the DNS request is sent all the way to the original DNS server for support of billing and lawful interception. If the DNS response can't be generated locally by the DNS cache & server, the DNS response coming from the original server shall be sent to the terminal.

Functions, operations, components and/or features described herein with reference to one or more embodiments, may be combined with, or may be utilized in combination with, one or more other functions, operations, components and/or features described herein with reference to one or more other embodiments, or vice versa. It is understood by one of ordinary skill in the art that features, elements and functions described in connection with the CDNS may be included within the ZSDNS. It is likewise understood by one of ordinary skill in the art that features, elements and functions described in connection with the ZSDNS may be included within the CDNS.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A conditional domain name system (CDNS) associated with an access point of a data communication network, said system comprising:
   a DNS query detector to detect a DNS query generated by a data client device communicatively coupled to the access point, wherein the DNS query is addressed to an external DNS and requests a network address of a given networked data resource and continues towards the external DNS;
   control logic circuitry to search a functionally associated data repository or cache for a conditional DNS record relating to the given networked data resource, wherein the conditional DNS record includes or links with: (a) an identifier or designator of the given networked data resource, (b) a given network address for the given networked data resource, and (c) a definition of a condition under which said CDNS will provide the given network address as a response to the DNS query for the given networked data resource.

2. The system according to claim 1 and further comprising a condition checking unit (CCU) to parse a condition definition associated with the conditional DNS record and to generate data packets configured to check whether the defined condition is met.

3. The system according to claim 2 and further comprising a conditional DNS Request Response Unit (CDNSRU) to generate a response to the detected DNS query at least partially based on an outcome of a verification of the condition definition associated with an identified conditional DNS record, wherein the verification includes checking whether the defined condition is met.

4. The system according to claim 3, wherein the defined condition associated with the conditional DNS record relates to authentication requirements of the given networked data resource designated within the conditional DNS record.

5. The system according to claim 2, further comprising a DNS record updater to update records within the functionally associated data repository or cache with information from responses received from the external DNS or from said CCU.

6. The system according to claim 5, wherein updating includes amending a record of the functionally associated data repository.

7. The system according to claim 5, wherein updating includes appending new records to the functionally associated data repository.

8. The system according to claim 1, wherein said control logic circuitry is further adapted to cause blocking of a DNS answer received from the external DNS.

9. The system according to claim 5, wherein said control logic circuitry is adapted to block the DNS answer when the conditional DNS record for the given networked data resource is identified within said functionally associated data repository and the defined condition associated with the identified conditional DNS record is met.

10. A method of providing domain name system (DNS) services on a data communication network having at least one access point, said method comprising:
    detecting a DNS query generated by a data client device communicatively coupled to an access point of the data communication network and addressed to an external DNS, wherein the DNS query includes a request for a network address of a given networked data resource and continues towards the external DNS;
    searching a functionally associated data repository or cache for a conditional DNS record relating to the given networked data resource, wherein the conditional DNS record includes or is linked with: (a) an identifier or designator of the given networked data resource, (b) a given network address for the given networked data resource, and (c) a definition of a condition under which the DNS will provide the given network address as a response to the DNS query for the given networked data resource.

11. The method according to claim 10, further comprising parsing the definition of the condition under which the DNS will provide the given network address associated with the conditional DNS record and generating data packets configured to check whether the defined condition is met.

12. The method according to claim 11, further comprising generating a response to the detected DNS query at least partially based on an outcome of a verification of the condition definition associated with an identified conditional DNS record, wherein the verification includes checking whether the defined condition is met.

13. The method according to claim 11, wherein the condition is associated with an authentication requirement of the given networked data resource.

14. The method according to claim 11, further comprising blocking a DNS answer or response received from the external DNS.

15. The method according to claim 14, wherein blocking the external DNS answer or response occurs when the conditional DNS record for the given networked data resource is identified within the functionally associated data repository and a condition associated with the identified conditional DNS record was met.

16. The method according to claim 11, further comprising updating records within the functionally associated data repository or cache with information from responses received from the external DNS or from a condition checking unit.

17. A data communication network comprising:
one or more access points or nodes through which a data client device communicatively couples to said data communication network; and
a conditional domain name system (CDNS) functionally associated with at least one of said access points, wherein said CDNS comprises:
a DNS query detector to detect a DNS query generated by the data client device communicatively coupled to the access point, wherein the DNS query is addressed to an external DNS and requests a network address of a given networked data resource and continues towards the external DNS;
control logic circuitry to search a functionally associated data repository or cache for a conditional DNS record relating to the given networked data resource, wherein the conditional DNS record includes or links with: (a) an identifier or designator of the given networked data resource, (b) a given network address for the given networked data resource, and (c) a definition of a condition under which said CDNS will provide the given network address as a response to the DNS query for the given networked data resource.

18. The network according to claim 17, further comprising a condition checking unit (CCU) to parse a condition definition associated with the conditional DNS record and to generate data packets configured to check whether a condition associated with the conditional DNS record is met.

19. The network according to claim 18, further comprising a conditional DNS Request Response Unit (CDNSRU) to generate a response to the detected DNS query at least partially based on an outcome of a verification of the condition definition associated with an identified conditional DNS record, wherein the verification includes checking whether the defined condition is met.

20. The network according to claim 17, wherein said CDNS control logic circuitry is adapted to cause blocking of a DNS response or answer received from the external DNS.

21. The network according to claim 20, wherein said control logic circuitry is adapted to cause blocking of the external DNS response or answer when the conditional DNS record for the given networked data resource is identified within the functionally associated data repository and the defined condition associated with the identified conditional DNS record was met.

* * * * *